US008654609B2

(12) United States Patent
Tsurugaya et al.

(10) Patent No.: US 8,654,609 B2
(45) Date of Patent: Feb. 18, 2014

(54) TARGET DETECTION DEVICE, TARGET DETECTION CONTROL PROGRAM, AND TARGET DETECTION METHOD

(75) Inventors: Yoshiaki Tsurugaya, Tokyo (JP); Toshiaki Kikuchi, Kanagawa (JP)

(73) Assignee: NEC Corporation, Tokyo (JP)

( * ) Notice: Subject to any disclaimer, the term of this patent is extended or adjusted under 35 U.S.C. 154(b) by 388 days.

(21) Appl. No.: 13/127,667

(22) PCT Filed: Nov. 5, 2009

(86) PCT No.: PCT/JP2009/068926
§ 371 (c)(1),
(2), (4) Date: Jul. 15, 2011

(87) PCT Pub. No.: WO2010/053137
PCT Pub. Date: May 14, 2010

(65) Prior Publication Data
US 2012/0000289 A1    Jan. 5, 2012

(30) Foreign Application Priority Data
Nov. 7, 2008   (JP) ................................ 2008-287203

(51) Int. Cl.
*G01S 15/00*   (2006.01)
(52) U.S. Cl.
USPC ............................................ 367/100; 367/99
(58) Field of Classification Search
USPC .................... 367/7, 99, 145; 340/553
See application file for complete search history.

(56) References Cited

U.S. PATENT DOCUMENTS

| 5,122,990 A | * | 6/1992 | Deines et al. | 367/100 |
| 5,208,785 A | * | 5/1993 | Brumley et al. | 367/90 |
| 5,305,286 A | * | 4/1994 | Woodsum et al. | 367/92 |
| 5,563,848 A | * | 10/1996 | Rogers et al. | 367/99 |

(Continued)

FOREIGN PATENT DOCUMENTS

| JP | 2008-249532 A | 10/2008 |
| JP | 2009-219876 A | 10/2009 |
| WO | 2010/053136 A1 | 5/2010 |

OTHER PUBLICATIONS

Claire Prada, et al., "Decomposition of the Time Reversal Operator: Detection and Selective Focusing on Two Scatterers", J. Acoust. Soc. Am., Apr. 1996, pp. 2067-2076, vol. 99 , No. 4, Pt. 1.

(Continued)

*Primary Examiner* — Isam Alsomiri
*Assistant Examiner* — Hovhannes Baghdasaryan
(74) *Attorney, Agent, or Firm* — Sughrue Mion, PLLC

(57) ABSTRACT

A target detection device includes: a sound source which projects a sound pulse; a transducer array disposed in a region for receiving a forward scattered wave from an object in the propagation environment; an addition processing unit which extracts only a signal of the forward scattered wave by applying vector addition processing on a reference signal in a reference sound field received when an obstacle exists in the propagation environment and a mixed signal in a mixed sound field received when the target exists with the obstacle; a phase conjugation determination unit which checks whether a phase conjugacy is established by receiving the signal of the extracted forward scattered wave and employing a passive phase conjugation for determining the reference sound field; and a time reversal processing unit which generates a time reversal signal on condition that the phase conjugation determination unit judges that the phase conjugacy is established.

9 Claims, 12 Drawing Sheets

(56) References Cited

U.S. PATENT DOCUMENTS

| | | | |
|---|---|---|---|
| 2005/0146433 A1* | 7/2005 | Waltermann | 340/553 |
| 2006/0109743 A1* | 5/2006 | Kosalos et al. | 367/88 |
| 2006/0133211 A1* | 6/2006 | Yang | 367/154 |
| 2006/0164270 A1* | 7/2006 | Miller et al. | 341/143 |
| 2006/0227042 A1* | 10/2006 | Budic | 342/195 |
| 2007/0040729 A1* | 2/2007 | Ohnishi | 342/93 |
| 2007/0071077 A1* | 3/2007 | Yang | 375/218 |
| 2007/0140499 A1* | 6/2007 | Davis | 381/23 |
| 2007/0159922 A1* | 7/2007 | Zimmerman et al. | 367/103 |
| 2007/0274152 A1* | 11/2007 | Rees | 367/7 |
| 2008/0018521 A1* | 1/2008 | Sahinoglu et al. | 342/27 |
| 2008/0031463 A1* | 2/2008 | Davis | 381/17 |
| 2008/0239873 A1* | 10/2008 | Tsurugaya et al. | 367/93 |
| 2009/0234230 A1 | 9/2009 | Bercoff et al. | |
| 2009/0323473 A1* | 12/2009 | Tsurugaya et al. | 367/100 |

OTHER PUBLICATIONS

Jean-Gabriel Minonzio, et al., "Multiple Scattering Between Two Elastic Cylinders and Invariants of the Time-Reversal Operator: Theory and Experiment", J. Acoust. Soc. Am., Aug. 2006, pp. 875-883, vol. 120, No. 2.

David R. Dowling, "Acoustic Pulse Compression Using Passive Phase-Conjugate Processing", J. Acoust. Soc. Am., Mar. 1994, pp. 1450-1458, vol. 95, No. 3.

W.A.Kuperman, et al., "Phase Conjugation in the Ocean: Experimental Demonstration of an Acoustic Time-Reversal Mirror", J. Acoust. Soc. Am., Jan. 1998, pp. 25-40, vol. 103, No. 1.

* cited by examiner

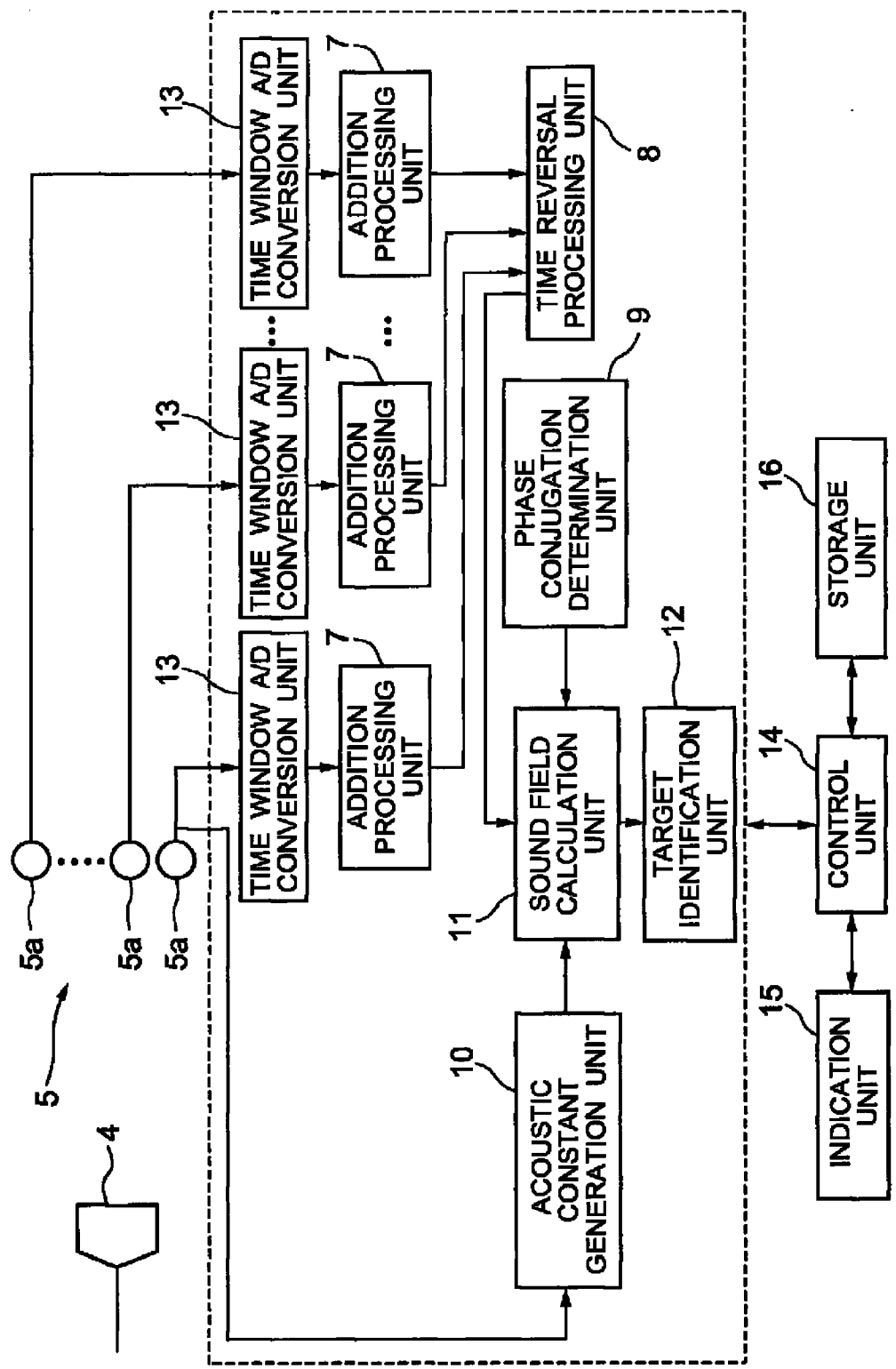

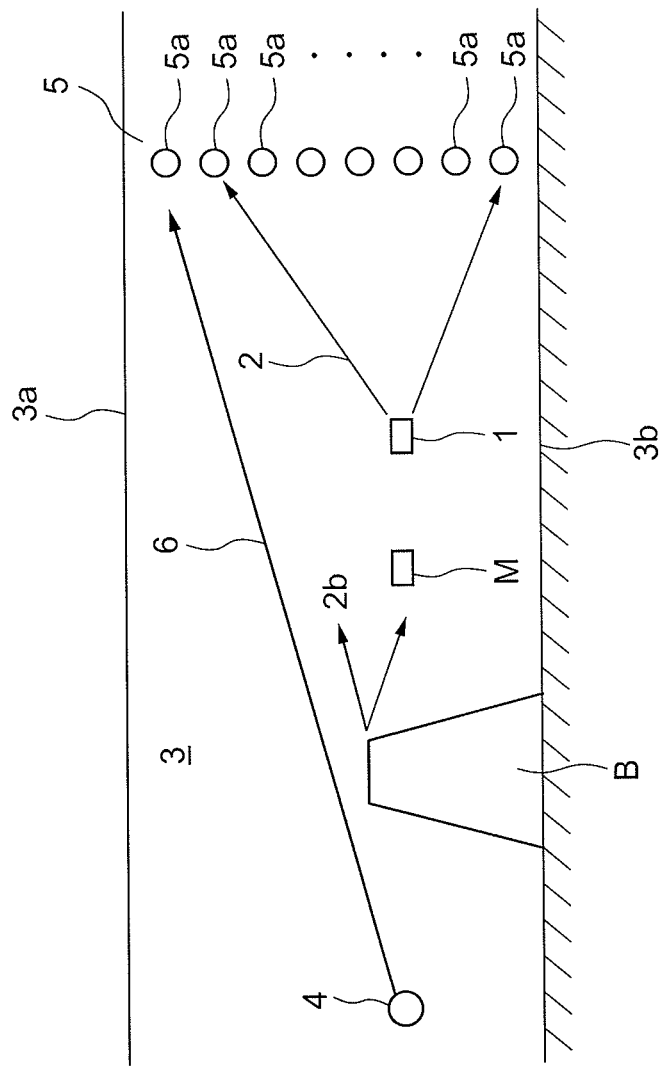

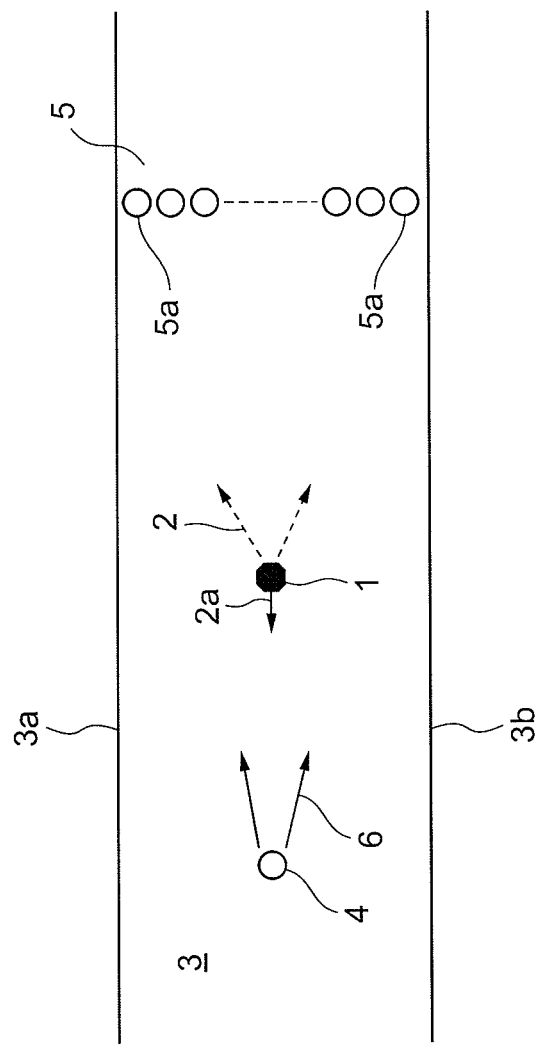

TARGET DETECTION DEVICE, TARGET DETECTION CONTROL PROGRAM, AND TARGET DETECTION METHOD

CROSS REFERENCE TO RELATED APPLICATIONS

This application is a National Stage of International Application No. PCT/JP2009/068926 filed Nov. 5, 2009, claiming priority based on Japanese Patent Application No. 2008-287203, filed Nov. 7, 2008, the contents of all of which are incorporated herein by reference in their entirety.

TECHNICAL FIELD

The present invention relates to a target detection device, a target detection control program, and a target detection method for detecting a target existing in a propagation environment where a sonic pulse propagates.

BACKGROUND ART

When the propagation environment where the sound pulse propagates is the underwater, for example, a sonar is widely used as a method for detecting targets existing in the underwater. That is, the distance and direction of a target are acquired through sweeping the underwater by using a sonic beam and receiving a reflected wave from the target that comes within the sonic beam. For extending the detection distance, it is necessary to use a low frequency sonic wave (e.g., 500 Hz) of a small absorption attenuation. However, when the frequency of the sonic wave is lowered, the sonic beam becomes widened and further increases an influence by reflections at the sea surface and the seabed, thereby making it difficult to detect the target.

Therefore, recently, there has been an increasing interest in a new target detection method using phase conjugated waves and time reversal waves.

C. Prada et al. perform so-called the time reversal processing which receives backward scattered waves scattered from a target existing in the water towards a sound source side and reverses the time axis of the received wave signal, and re-radiates the time reversal signal into the water. The re-radiated sonic wave converges to the position of the target. The converged sonic wave generates a reflection wave that is stronger than before. The reflected wave is received, and the time reversal processing is performed thereon again to be re-radiated. The sonic wave strongly converges to the position of the target.

Through repeating the above-described operation, it is possible to specify objects in order from larger ones to smaller ones.

Non-Patent Document 1: C. Prada, S. Manneville, D. Spoliansky, and M. Fink, "Docomposion of the time reversal operator: detection and selective focusing on two scatterers", J. Acoust. Soc. Am. 99, 2067-2076 (1996)

DISCLOSURE OF THE INVENTION

Problems to be Solved by the Invention

However, with the method proposed by C. Prada et al., it is necessary to repeat the time reversal processing twice or more. Thus, it requires a tremendous amount of time for detecting a target.

Further, in a case where targets exist neighboring to each other or in a case where the sizes of the targets are equal, it is difficult to discriminate each target. Further, in a case where the frequency of the sonic wave used for detecting is low, it becomes difficult to discriminate the targets due to an influence of reflections at the sea surface and the seabed.

An object of the present invention is to provide a target detection device, a target detection control program, and a target detection method for detecting targets existing in a propagation environment by using forward scattered waves scattered from the targets instead of backward scattered waves from the targets and by employing time reversal waves of the forward scattered waves.

Means for Solving the Problems

In order to achieve the foregoing target, the target detection device according to the present invention is a target detection device for detecting a target existing in a propagation environment, which detects the target by using a forward scattered wave scattered forward from the target, and the device is characterized to include:
  a sound source which projects a sound pulse within the propagation environment;
  a transducer array disposed in a region for receiving a forward scattered wave scattered forward from an object existing in the propagation environment;
  an addition processing unit which extracts only a signal of the forward scattered wave by applying vector addition processing on a reference signal in a reference sound field received by the transducer array under a state where an obstacle exists in the propagation environment and a mixed signal in a mixed sound field received by the transducer array under a state where the target exists in the propagation environment in addition to the obstacle;
  a phase conjugation determination unit which checks whether or not a phase conjugacy is established in the propagation environment from the sound source to the transducer array by receiving the signal of the forward scattered wave extracted by the vector addition processing performed by the addition processing unit and employing a passive phase conjugation for determining the reference sound field; and
  a time reversal processing unit which generates a time-reversed time reversal signal by applying time reversal processing on the forward scattered wave, on condition that the phase conjugation determination unit judges that the phase conjugacy is established.

In the above case, while the present invention is built as the object probing device as hardware, the present invention is not limited only to such case. The present invention can be built as a method for detecting the object or a program as software which causes a computer to execute the functions of the object probing device.

The target detection control program according to the present invention is a target detection program for controlling detection of a target existing in a propagation environment, which is characterized to cause a computer to execute:
  a function which extracts only a signal of the forward scattered wave by applying vector addition processing on a reference signal in a reference sound field received by a transducer array under a state where an obstacle exists in the propagation environment and a mixed signal in a mixed sound field received by the transducer array under a state where the target exists in the propagation environment in addition to the obstacle; and
  a function which checks whether or not a phase conjugacy is established in the propagation environment from a sound source to the transducer array by employing a passive phase conjugation for determining the reference sound field, and generates a time-reversed time reversal signal by applying time reversal processing on the extracted forward scattered wave on condition that the phase conjugacy is established.

The target detection method according to the present invention is a target detection method for detecting a target existing in a propagation environment, which detects the target by using a forward scattered wave scattered forward from the target. The method is characterized to include:

projecting a sound pulse within the propagation environment;

extracting only a signal of the forward scattered wave by applying vector addition processing on a reference signal in a reference sound field received by the transducer array under a state where an obstacle exists in the propagation environment and a mixed signal in a mixed sound field received by the transducer array under a state where the target exists in the propagation environment in addition to the obstacle; and checking whether or not a phase conjugacy is established in the propagation environment from a sound source to the transducer array by employing a passive phase conjugation for determining the reference sound field, and generating a time-reversed time reversal signal by applying time reversal processing on the extracted forward scattered wave on condition that the phase conjugacy is established.

Effect of the Invention

The present invention extracts only the forward scattered wave of the target by performing the vector addition processing of the reference signal received by the transducer array in the reference sound field constituted with a complicated propagation environment including obstacles and the mixed signal received by the transducer array in the mixed sound field including the target within the reference sound field, applies the time reversal processing on the extracted forward scattered wave, and converges it to the position of the target. This makes it possible to detect a target existing in a shaded region of the seamount as well as icebergs as obstacles or a target existing in the back of a non-target object considered to be difficult to detect by a widely-used sonar and a method using backward scattered waves and time reversal.

Further, regarding the propagation environment of the reference sound field where the reference signal is acquired, it is verified that there is no problem for detecting a target even in a propagation environment of the sound pulse having an obstacle existing therein other than the target. Thus, a complicated propagation environment and an environment having obstacles existing therein can also be used as the reference sound field, so that it is possible to detect a target in the complicated propagation environment. As a result, it becomes possible to detect an object existing in a shaded region of the seamount as well as icebergs as obstacles or a target existing in the back of a non-target object considered to be difficult to detect by a widely-used sonar and a method using backward scattered waves and time reversal.

BEST MODES FOR CARRYING OUT THE INVENTION

Hereinafter, exemplary embodiments of the invention will be described in details by referring to the drawings.

There are the aforementioned issues in the method proposed by C. Prada et al., i.e., the method which repeats the time reversal processing on the backward scattered waves which scatter (reflect) backward from a target. Thus, as a method that overcomes such issues, the exemplary embodiment of the invention proposes a method which achieves detection of the target by using forward scattered waves scattered forward from the target. For explaining the exemplary embodiment of the invention by referring to FIG. 1 and FIG. 2, a reference sound field, a reference signal, a mixed sound field, and a mixed signal are defined as follows. Under a layout of a sound source 4 and a transducer array 5 shown in FIG. 2, a sound pulse is projected from the sound source 4 in a state where a target 1 as a detection target does not exist within a propagation environment 3 including an obstacle B or a non-target object M, and the sound pulse is received by the transducer array 5. The sound field of that condition is defined as the reference sound field. The sound pulse received by the transducer array 5 in the reference sound field is defined as a reference signal S1. Then, in a state where, within the reference sound field, the target 1 as the detection target exists within the propagation environment 3, the sound pulse is projected from the sound source 4, and it is received by the transducer array 5. The sound field of that condition is defined as the mixed sound field. The sound pulse received by the transducer array 5 in the mixed sound field is defined as a mixed signal S2.

First, the relation between a backward scattered wave 2a scattered backward from the target 1 and a forward scattered wave 2 scattered forward from the target 1 will be described by referring to FIG. 6. As shown in FIG. 6, assuming that the propagation environment 3 where a sound pulse propagates is a shallow water, a scattered wave scattered from the target 1 existing in the shallow water 3 towards the sound source 4 side, i.e., the scattered wave scattered backward, is the backward scattered wave 2a, and the scattered wave scattered from the target 1 towards the transducer array 5 side, i.e., scattered forward, is the forward scattered wave 2. In a case where the propagation environment 3 is the shallow water, 3a is the sea surface and 3b is the seabed.

In general, the level of a sound pulse (traveling wave 6) directly travelling in the shallow water 3 towards the transducer array 5 is greater than the level of the forward scattered wave 2 scattered forward from the target 1. Thus, it is difficult to isolate the forward scattered wave 2 from the received sound pulse and discriminate the forward scattered wave 2.

Therefore, the exemplary embodiment of the invention isolates only the forward scattered wave 2 from the target 1 based on the reference signal S1 in the reference sound field and the mixed signal S2 in the mixed sound field, and performs time reversal processing on the isolated forward scattered wave 2 to detect the target 1 existing within the propagation environment 3.

That is, the exemplary embodiment of the invention is characterized to detect the target 1 existing within the propagation environment 3 by extracting the forward scattered wave 2 from the target 1 based on the reference signal S1 and the mixed signal S2 in the layout of the sound source 4 and the transducer array 5 shown in FIG. 2.

The propagation environment 3 will be verified by assuming that the propagation environment 3 where the target 1 is to be detected as a shallow water, for example. As shown in FIG. 2, as the propagation environment 3 where the target 1 is actually detected (referred to as an actual propagation environment hereinafter), there may be cases including obstacles B such as the seamount, icebergs, and the object M that is not a detection target, other than the target 1 that is the detection target. For the sake of explanations, the obstacle B and the object M are collectively referred to as the obstacle B. In a case where the sound field in the propagation environment of the shallow water 3 considered to have no target 1 existing therein is utilized as the reference sound field, the reference signal S1 in the reference sound field contains a component of the forward scattered wave 2b scattered forward from the obstacle B in addition to a component of the traveling wave 6 which travels directly from the sound source 4 and received by the transducer array 5.

In the meantime, when the mixed signal S2 is acquired by having the sound field in the propagation environment of the shallow water 3 considered to have the target 1 existing therein as the mixed sound field, the mixed signal S2 in the mixed sound field contains the component of the traveling wave 6 which travels directly from the sound source 4 and received by the transducer array 5 and the component of the forward scattered wave 2b scattered forward from the obstacle B in addition to the forward scattered wave 2 scattered forward at the target 1.

In order to isolate (extract) the forward scattered wave 2b scattered forward at the target 1 based on the reference signal S1 and the mixed signal S2, it is necessary to eliminate the component of the traveling wave 6 from the reference signal S1 and the mixed signal S2, and then isolate and extract the forward scattered wave 2 of the target 1 from the component of the forward scattered wave 2b of the obstacle B from the remaining signal acquired by the elimination processing. Note here that the forward scattered wave 2b of the obstacle B is the same type as that of the forward scattered wave 2 of the target 1. It is because the sound pulse from the sound source 4 first hits the obstacle B, and generates the forward scattered wave 2b from the obstacle B. As a result, the traveling wave 6 from the sound source 4 and the forward scattered wave 2b hit the target 1, and generate the forward scattered wave 2 of the target 1. Thus, the traveling wave 6, the forward scattered wave 2b, and the forward scattered wave 2 simultaneously arrive at the elements 5a of the transducer array 5. Therefore, it is difficult to isolate and identify only the forward scattered wave 2 of the target 1 in terms of time.

It is known that the travelling wave projected from a same sound source and a reflected wave as well as scattered wave generated thereby are coherent in the propagation environment where the phase conjugacy is established. Further, the coherent waves exhibit coherence, and it is possible to add those waves vectorially.

Non-Patent Document 2: D. R. Dowling, "Acoustic pulse compression using passive phase-conjugate processing" J. Acoust. Soc, Am. 95, 1450-1458 (1994)

In the exemplary embodiment of the invention, the method for investigating whether or not the propagation environment can be a reference sound field is clarified. As a result of investigating the propagation environment including the seamount as well as icebergs and the propagation environment including a non-target object by using that method, there has been devised a method of taking a sound field where the sound pulse propagates therein while keeping the conjugacy as a reference sound field. This results in making it possible to detect only the target object by excluding the influence of unnecessary obstacles (e.g., the obstacle B and the non-target object M) which are not the targets.

Specifically, the exemplary embodiment of the invention has successfully achieved extraction of only the forward scattered wave 2 of the target 1 from the reference signal S1 and the mixed signal S2 by applying the fact disclosed in Non-Patent Document 2: D. R. Dowling, "Acoustic pulse compression using passive phase-conjugate processing" J. Acoust. Soc, Am. 95, 1450-1458 (1994) that the wave motions in the propagation environment where the phase conjugacy is established are coherent. This will be verified by a simulation described later.

Further, for extracting the forward scattered wave 2 from the target 1 based on the reference signal S1 and the mixed signal S2, it is important that the phase conjugacy is established in the propagation environment 3 from the sound source 4 to the transducer array 5. As shown in FIG. 2, the phase conjugation includes active phase conjugation related to the outgoing and incoming paths between the sound source 4 and the transducer array 5 as well as passive phase conjugation related only to the outgoing path from the sound source 4 to the transducer array 5. The passive phase conjugation is applied for determining the reference sound field.

Next, the basic theory of the exemplary embodiment according to the present invention will be described.

There is assumed a case where the propagation environment 3 shown in FIG. 2 is a shallow water such as a continental shelf, for example. As shown in FIG. 2, the sound source 4 and the transducer array 5 are disposed by opposing to each other in the shallow water 3. First, in a case where the target 1 does not exist between the sound source 4 and the transducer array 5, a sound pulse is radiated from the sound source 4 into the shallow water 3 by having the sound field of the shallow water 3 as the reference sound field in that state and the sound pulse propagated in the shallow water 3 is received at each element 5a of the transducer array 5. The received signal is saved in each of the elements 5a of the transducer array 5. This signal is the reference signal S1 in the reference sound field. In this case, it is unnecessary to mind the influence of the obstacle B and the object M existing in the shallow water 3 that is the propagation environment utilized as the reference sound field. This will be verified in the simulation described later.

Then, in a case where it is considered to have the target 1 existing therein, a sound pulse of an inverted phase from the sound pulse radiated earlier is radiated from the sound source 4 into the shallow water 3 by having the sound field of the shallow water 3 in that state as the mixed sound field. The sound pulse radiated earlier is the sound pulse radiated from the sound source 4 when acquiring the reference signal S1. The sound pulse propagated in the shallow water 3 in the mixed sound field is received at each element 5a of the transducer array 5. This signal is the mixed signal S2 in the mixed sound field.

Then, the mixed signal S2 received in the mixed sound field and the reference signal S1 received in the reference sound field are added vectorially (vector addition processing). In this case, components (traveling waves 6) of the sound pulse itself radiated from the sound source 4 and received directly by the transducer array 5 and the component of the forward scattered wave 2b scattered at the obstacle B are contained in the reference signal S1 and the mixed signal S2 in a relation of inverted phases from each other, so that those components cancel each other and disappear due to the vector addition processing. The relation of inverted phases from each other is a relation where the phase of the mixed signal S2 is an inverted phase, provided that the phase of the reference signal S1 is a normal phase.

The vector addition processing for the traveling wave 6 radiated from the sound source 4 is as described above. Processing for the forward scattered wave 2 scattered forward by the target 1 will now be described. Components of the forward scattered wave 2 that is the scattered wave of the sound pulse radiated from the sound source 4, made incident on the target 1, and scattered forward are contained in the mixed signal S2 received in the mixed sound field but not contained in the reference signal S1 received in the reference sound field. Further, when the target 1 exists in the shallow water 3, the components of the forward scattered wave 2 are contained in the mixed signal S2 received in the mixed sound field. Meanwhile, when the target 1 does not exist in the shallow water 3, the components of the forward scattered wave 2 are not contained in the mixed signal S2. The forward scattered wave 2 is extracted by utilizing the properties of those signals S1 an S2.

Thus, in the exemplary embodiment of the invention, the mixed signal S2 received in the mixed sound field and the reference signal S1 received in the reference sound field are added vectorially (vector addition processing). When the forward scattered wave 2 is contained in the mixed signal S2 as a result of performing the vector addition processing, the components of the forward scattered wave 2 are not cancelled even by the vector addition processing but remained therein.

For the vector addition processing, the fact disclosed in Non-Patent Document 2: D. R. Dowling, "Acoustic pulse compression using passive phase-conjugate processing" J. Acoust. Soc, Am. 95, 1450-1458 (1994) that the wave motions in the propagation environment where the phase conjugacy is established are coherent is applied.

Time reversal processing is applied on the forward scattered wave 2 remained in each of the elements 5a of the transducer array 5 due to the vector addition processing, and the sonic pulses that are time reversal signals on which the time reversal processing is applied are radiated towards the direction where the sound source 4 is placed from each of the elements 5a of the transducer array 5 simultaneously. Here, the sound pulses radiated from each of the elements 5a of the transducer array 5 by applying the reversal processing on the extracted forward scattered wave 2 are converged to the position of the target 1 according to the time reversal theory.

The target 1 is detected by monitoring, on the display, the amplitude distribution of the sonic pulses radiated from each of the elements 5a of the transducer array 5 over the entire detected sea area by applying the time reversal processing.

As described above, the exemplary embodiment of the invention is characterized to detect the target 1 existing in the propagation environment 3 by extracting the forward scattered wave 2 from the target 1 based on the reference signal S1 and the mixed signal S2. For extracting the forward scattered wave 2 from the target 1 based on the reference signal S1 and the mixed signal S2, it is important that the phase conjugacy is established in the propagation environment 3 from the sound source 4 to the transducer array 5. The phase conjugation includes active phase conjugation related to the outgoing and incoming paths between the sound source 4 and the transducer array 5 as well as passive phase conjugation related only to the outgoing path from the sound source 4 to the transducer array 5.

The exemplary embodiment of the invention checks whether or not the phase conjugacy is established in the propagation environment 3 from the sound source 4 to the transducer array 5 by employing the passive phase conjugation for determining the reference sound field, and detects the target 1 based on the reference signal 51 and the mixed signal S2 as described above on condition that the phase conjugacy is established.

Next, the feature of the exemplary embodiment of the invention will be checked by a simulation.
Simulation Result:
(1) Time Reversal Sound Field in Shallow Water where Obstacles (Seamount) B Exist As shown in FIG. 2, the sound source 4 and the transducer array 5 are disposed by opposing to each other in the shallow water 3 where the seamount B as a kind of obstacles exist. The water depth is 100 m, and the height of the seamount B is 50 m from the seabed 3b. The distance from the sound source 4 to the seamount B is 1 km, and the distance from the sound source 4 to the transducer array 5 is 3 km. A tone burst wave (sound pulse) with the center frequency of 500 Hz is radiated from the sound source 4 located at the depth of 50 m. The radiated sound pulse is received at each of the elements 5a of the transducer array 5, and so-called the time reversal waves acquired by applying time reversal processing on the received signals are radiated simultaneously from all the elements 5a. The amplitude distribution of the radiated time reversal waves is shown in FIG. 8. In the charts showing the amplitude distribution of the sound pulse presented hereinafter including FIG. 8, a part where the sound pressure of the sound pulse from the sound source 4 is strong is shown in white, a part where the sound pressure is weak is shown in black, and the sound pressure of the levels therebetween is shown in gray with gradations (become closer to white in proportion to an increase in the level thereof). Further, in the charts showing the amplitude distribution of the sound pulse, the longitudinal axis is the depth (m), and the lateral axis is the distance (km).

As can be seen in FIG. 8, the time reversal waves radiated simultaneously from all the elements 5a of the transducer array 5 travel towards the position of the sound source 4 by going over the seamount B and converge to the position of the sound source 4. This shows the theory and the feature of the time reversal.

(2) Time Reversal Sound Field of Case which Includes Obstacle B and Target 1

Next, the time reversal sound field is acquired by placing the target 1 in the shallow water 3 where the seamount B shown in FIG. 2 exists. The position of the target 1 as the detection target is 1.5 km from the sound source and at the water depth of 70 m. The material of the target 1 is iron, and the size thereof is 2 m both in length and width. When viewed from the sound source 4 side, the target 1 is in the shaded region of the seamount B. Thus, it cannot be detected by a widely-used sonar. The time reversal sound field in this propagation environment is shown in FIG. 9.

FIG. 9 shows a state that exhibits almost no difference from the state shown in FIG. 8, in which the time reversal waves travel towards the position of the sound source 4 but no change in the pattern is observed at all in the vicinity of the target 1. The target 1 is in the size of 2 m both in length and width which is smaller than 3 m that is the wavelength of the sound pulse, so that it is in a size difficult to be detected by the widely-used sonar. Therefore, it is considered that the forward scattered wave 2 of the target 1 is masked by the traveling wave 6 since the level of the forward scattered wave 2 scattered at the target 1 is smaller than the level of the traveling wave 6 that is the direct wave from the sound source 4.

(3) Time Reversal Sound Field Only with Forward Scattered Wave 2 Scattered Forward at Target 1

Isolation of the traveling wave 6 from the sound source 4 and the forward scattered wave from the target 1 is mentioned in the section of the basic theory described above. Based on the theory, the time reversal sound field only with the forward scattered wave 2 from the target 1 is acquired.

First, a sound pulse is radiated from the sound source 4 in a case where the target 1 does not exist in the propagation environment 3, and the wave is received and saved at each element 5a of the transducer array 5. This is the reference signal S1 in the reference sound field.

Then, in a case where the target 1 exists in the propagation environment 3, a sound pulse of an inverted phase from the phase (assumed as a normal phase) of the sound pulse radiated when the target 1 does not exist is radiated from the sound source 4 into the shallow water 3. The wave is received and saved at each element 5a of the transducer array 5. This is the mixed signal S2.

Then, the reference signal S1 and the mixed signal S2 are added vectorially. Through this operation, the components of the traveling wave 6 and the forward scattered wave 2b from the obstacle B are cancelled, and only the scattered wave component 2 from the target 1 remains in each of the elements 5a. This is because the components of the travelling wave 6 and the forward scattered wave 2b from the obstacle B are contained in the reference signal S1 and the mixed signal S2 in phases inverted from each other, so that the components of the travelling wave 6 and the forward scattered wave 2b from the obstacle B in the inverted phases from each other are eliminated by cancelling each other.

The time reversal processing is applied on the signals remained in each of the elements 5a, and the time reversal waves are simultaneously re-radiated from each of the elements 5a. The amplitude distribution of the time reversal waves radiated with this method is shown in FIG. 10. As is clear from FIG. 10, it can be seen that the time reversal waves converge to the position of the target 1. There is no wave converged to the sound source 4 and the seamount B. That is, the target 1 existing in the shaded region of the seamount B viewed from the sound source 4 side can be detected easily.

(4) Time Reversal Sound Field of Case which Includes Plural Targets

The method described in the section of (3) is also effective in a case where there are a plurality of targets 1 existing therein. Two targets 1a and 1b are disposed vertically in a flat propagation environment 3 containing no seamount B. The distance of the targets 1a and 1b from the sound source 4 is 1.5 km, the depth of the target 1a is 40 m, and the depth of the other target 1b is 60 m. The time reversal sound field created by the method of eliminating the traveling wave 6 described in the section of (3) is shown in FIG. 11.

As is clear from FIG. 11, it can be seen that the two targets 1a and 1b exist in the propagation environment 3 by being disposed vertically.

(5) Time Reversal Sound Field of Case where Target Exists in Shaded Region of Obstacle B It has been verified in (4) that the method described in the section of (3) is also effective in the case where there are a plurality of targets 1. However, there may be cases where the amplitude distribution of the sound pulse becomes unclear since there is an influence of the forward scattered wave from the non-target object M in addition to the traveling wave 6 depending on the position of the target 1.

Thus, there is considered a case where two targets, i.e., the target 1 and the non-target object M are disposed horizontally. The distance from the sound source 4 to the non-target object M is set as 1.5 km, the distance from the sound source 4 to the target 1 is 1.7 km, and the depths of the target 1 and the object M are both set as 50 m. In this case, the signal used as the reference signal S1 is different from the reference signal based on the sound pulse propagated in the flat propagation environment used in the section of (3). That is, in the case of (5), a signal based on the sound pulse propagated when there is only the non-target object M existing in the flat propagation environment 3 is used as the reference signal S1. Then, the target 1 is disposed in the propagation environment 3 in addition to the non-target object M.

In this state, the sound pulse from the sound source 4 is projected. The forward scattered waves scattered forward from the target 1 and the non-target object M as well as the traveling wave 6 from the sound source 4 are received at each of the elements 5a of the transducer array 5. This is the mixed signal S2 of this case. Then, the mixed signal S2 and the reference signal S1 are added vectorially. In this case, the forward scattered wave from the non-target object M and the traveling wave 6 from the sound source 4 are contained in the reference signal S1 and the mixed signal S2 in a relation of inverted phases from each other. Thus, the signal components offset each other and are eliminated, so that only the signal of the forward scattered wave from the target 1 is remained. When the time reversal processing is applied on the signals and the sonic pulses of the time reversal signal are projected towards the direction of the sound source 4 from each of the elements 5a of the transducer array 5, the time reversal sound field with only the forward scattered waves from the target 1 is generated. The generated time reversal sound field is shown in FIG. 12. FIG. 12 shows the amplitude distribution of the sound pulses. As is clear from FIG. 12, it can be seen that only the target 1 as the detection target exists at the position that is 1.7 km from the sound source 4.

With the detection method proposed in Non-Patent Document 1 shown in the section of BACKGROUND ART, it is necessary to repeat the time reversal processing for twice or more. In addition, it is difficult to discriminate the targets when the sizes of the targets are the same. Compared to that, the effectiveness of the method proposed by the exemplary embodiment of the invention is more distinct.

Based on the technical analysis and the simulation results described above, the exemplary embodiment of the invention detects the target 1 existing within the propagation environment 3 by extracting the forward scattered wave 2 from the target 1 based on the reference signal S1 received in the reference sound field and the mixed signal S2 received in the mixed sound field in the layout of the sound source 4 and the transducer array 5 shown in FIG. 2. Moreover, the exemplary embodiment checks whether or not the phase conjugacy is established in the propagation environment 3 from the sound source 4 to the transducer array 5 by employing the passive phase conjugation for determining the reference sound field, generates a time-reversed sound pulse and re-radiates it by applying the time reversal processing on the extracted forward scattered wave 2, on condition that the phase conjugacy is established. Hereinafter, the exemplary embodiment of the invention will be described in details by using a specific example.

As shown in FIG. 1, as the basic structures, the target detection device according to the exemplary embodiment of the invention includes an addition processing unit 7, a time reversal processing unit 8, a phase conjugacy determination unit 9, an acoustic constant generation unit 10, a sound field calculation unit 11, and a target identification unit 12.

A control unit 14 comprehensively controls the addition processing unit 7, the time reversal processing unit 8, the phase conjugacy determination unit 9, the acoustic constant generation unit 10, the sound field calculation unit 11, the target identification unit 12, and the like. 16 is a storage unit which provides information required for operations of the control unit 14 and a work area required for arithmetic operations, and 15 is an indication unit which outputs data outputted via the control unit 14 to the outside.

There are the addition processing units 7 in the same number as that of the elements 5a provided by corresponding to the elements 5a of the transducer array 5. Further, the addition processing unit 7 stores the reference signal S1 in the reference sound field received at each element 5a of the transducer array 5, which is the sound pulse (the sound pulse of the normal phase) projected from the sound source 4 in the reference sound field where there is no target 1, by a unit of the element 5a. Furthermore, the addition processing unit 7 acquires the mixed signal S2 in the mixed sound field, which is the sound pulse of the inverted phase from that of the sound pulse projected from the source 4 earlier in the mixed sound field considered to have the target 1 existing therein and received at each element 5a of the transducer array 5. Further, the addition processing unit 7 extracts the forward scattered wave 2 from the target 1 based on the reference signal S1 and the mixed signal S2 by the vector addition processing.

For the vector addition processing, the fact disclosed in Non-Patent Document 2: D. R. Dowling, "Acoustic pulse compression using passive phase-conjugate processing" J. Acoust. Soc, Am. 95, 1450-1458 (1994) that the wave motions in the propagation environment where the phase conjugacy is established are coherent is applied.

The addition processing unit 7 receives a signal that is the signal received at each element 5a of the transducer array 5 and converted from an analog signal to a digital signal by a time window/AD conversion unit 13. There are the time window/AD conversion units 13 in the same number as that of the elements 5a provided by corresponding to each of the elements 5a of the transducer array 5.

The time reversal processing unit 8 receives only the signals of the forward scattered waves 2 from the target 1 extracted through performing the vector addition processing on the respective mixed signals S2 and reference signals 1 by two or more addition processing units 7, applies the time reversal processing on the extracted forward scattered waves 2, and generates the sound pulses that are the time-reversed time reversal signals.

The phase conjugation determination unit 9 checks whether or not the phase conjugacy is established in the propagation environment 3 from the sound source 4 to the transducer array 5 by applying the passive phase conjugation for determining the reference sound field through projecting calibration signals of a normal phase and an inverted phase from the sound source 4 in the propagation environment where there is no target 1, receiving the calibration signals at the elements 5a of the transducer array 5, and utilizing the fact that the normal phase and inverted-phase sound pulses offset each other and that the pulses exhibit compressibility.

The acoustic constant generation unit 10 generates an acoustic constant. Specifically, a sound pulse of a normal phase is projected from the sound source 4 in the propagation environment where there is no target 1, and the sound pulse is received at each of the elements 5a of the transducer array 5. The acoustic constant generation unit 10 compares the received sound pulse and the sound pulse calculated by the sound field calculation unit 11 based on the acoustic constant predicted in advance. When there is a difference found as a result of the comparison, the acoustic constant generation unit 10 changes the acoustic constant and makes a comparison with the received sound pulse again. The acoustic constant generation unit 10 determines the constant when those sound pulses match with each other as the acoustic constant.

The sound field calculation unit 11 calculates the time reversal sound field projected from the elements 5a of the transducer array 5, which is the sound pulse that is the time reversal signal generated by the time reversal processing unit 8, based on the acoustic constant determined by the acoustic constant generation unit 10.

The target identification unit 12 functions when convergence of the sound pulse in the time reversal sound field calculated by the sound field calculation unit 11 is unclear, and determines the target 1.

Next, described is a case of detecting the target 1 existing in the shallow water 3 as the propagation environment by using the target detection device according to the exemplary embodiment of the invention.

First, in a prestage of performing detection, a calibration signal is projected into the shallow water 3 from the sound source 4, received at one of the elements 5a of the transducer array 5, and the received signal is transmitted to the acoustic constant generation unit 10. The acoustic constant generation unit 10 fetches the received signal, eliminates an unnecessary signal, performs A/D conversion thereon, and uses it as the calibration signal. Further, the acoustic constant generation unit 10 calculates a constant of the propagation environment, i.e., the sound field of the actual propagation environment where the sound pulse propagates, based on the calibration signal. This will be described in a specific manner.

The target detection device according to the exemplary embodiment of the invention is used in a relatively shallow area of the sea such as a continental shelf. The acoustic constants of the sea regarding the sonic propagation under such environment are data of the depth of the water, sound speed in the seawater, seabed sediments (sound speed, density), and the like. Further, the acoustic constants of the sea regarding the sound pulse in the environment is data of the center frequency of the sound pulse, the spectrum of the sound pulse, the band width of the sound pulse, and the like. The data of the water depth for determining the acoustic constant of the sea can be acquired though conducting a direct measurement by using a measuring device such as a sounder. The seawater sound speed data for determining the acoustic constant of the sea can be acquired from a known sound speed formula such as Medwin (H. Medwin) formula by measuring the water temperature.

Regarding the data of the seabed sediments for determining the acoustic constant of the sea, approximate values can be estimated from a sea chart or the like. However, more accurate values can be acquired by a known calibration method. That is, the data of the sediment in the actual sea area is acquired by projecting the sound pulse of the normal phase from the sound source 4 hung in the detection sea area of the propagation environment where there is no target existing therein, receiving the sound pulse by the transducer array 5, and performing an arithmetic operation while changing the received signal and the predicted seabed sediment constant. Note here that the acoustic constant means an environmental factor which is a factor influencing upon the propagation of a sonic wave when the sound pulse actually propagates in the propagation environment. While the sea acoustic constants are used herein since assumed is the case of detecting the target 1 in the sea, the constants are not limited only to that. In a case where the propagation environment is other than the sea, the acoustic constant is an environmental factor that is a factor influencing upon the propagation of the sound pulse when the sound pulse actually propagates that propagation environment.

The data for determining the acoustic constant of the sea in the actual sea area regarding the sonic wave propagation and sound pulse is inputted in the acoustic constant generation unit 10. The acoustic constant generation unit 10 determines the acoustic constant of the sea in the actual sea area based on the inputted data for determining the acoustic constant of the sea and the calibration signal. The acoustic constant generation unit 10 outputs the determined acoustic constant of the sea in the actual sea area to the sound field calculation unit 11. While the sea acoustic constants are used herein since assumed is the case of detecting the target 1 in the sea. However, the constants are not limited only to that. In a case where the propagation environment is other than the sea, the acoustic constant generation unit 10 outputs the actual acoustic constant that is a factor influencing upon the propagation of the sound pulse when the sound pulse actually propagates in the propagation environment.

At a point where the processing of the acoustic constant generation unit 10 is ended, the sound pulse is radiated into the shallow water 3 from the sound source 4 in the reference sound field under the state where there is the obstacle B or the non-target object M existing between the sound source 4 and the transducer array 5. Each of the elements 5a of the transducer array 5 acquires the sound pulse propagated in the shallow water 3 as the reference signal S1 in the reference sound field.

Each element 5a of the transducer array 5 outputs the acquired reference signal S1 (electric signal) in the reference sound field to the time window/AD conversion unit 13. Upon receiving the reference signal S1, the time window/AD conversion unit 13 converts the reference signal S1 from an analog signal to a digital signal, and outputs converted signal to the addition processing unit 7.

The addition processing unit 7 receives the reference signals S1 outputted from all the time window/AD conversion units 13, and stores those signals.

Then, in the mixed sound field under a state considered to have the target 1 existing along with the obstacle B or the non-target object M between the sound source 4 and the transducer array 5, a sound pulse in a relation of inverted phase from the sound pulse radiated from the sound source 4 in the reference sound field is radiated into the shallow water 3 from the sound source 4. Each of the elements 5a of the transducer array 5 acquires the sound pulse propagated in the shallow water 3 as the mixed signal S2 in the mixed sound field.

Each element 5a of the transducer array 5 outputs the acquired mixed signal S2 (electric signal) to the time window/AD conversion unit 13. Upon receiving the mixed signal S2, the time window/AD conversion unit 13 converts the reference signal S2 from an analog signal to a digital signal, and outputs the converted mixed signal S2 to the addition processing unit 7.

The addition processing unit 7 receives the mixed signals S2 outputted from all the time window/AD conversion units 13 and applies the vector addition processing on the reference signal S1 and the mixed signal S2 at the time of acquiring the reference signal S1 and the mixed signal S2 to extract the signal of the forward scattered wave 2 from the target 1 from which the components of the traveling wave 6 and the scattered waves of the obstacle B or the non-target object M are eliminated (step 100 of FIG. 5). Then, the addition processing unit 7 outputs the extracted forward scattered wave 2 to the time reversal processing unit 8.

The phase conjugation determination unit 9 checks whether or not the phase conjugacy is established in the propagation environment 3 from the sound source 4 to the transducer array 5 by applying the passive phase conjugation for determining the reference sound field through projecting calibrations signals of a normal phase and an inverted phase from the sound source 4 in the propagation environment where there is no target 1, receiving the calibration signals at the elements 5a of the transducer array 5, and utilizing the fact that the normal phase and inverted-phase sound pulses offset each other and that the pulses exhibit compressibility (step 102 of FIG. 5).

Next, the processing executed by the phase conjugation determination unit 9 will be described in details.

For extracting the forward scattered wave 2 from the target 1 based on the reference signal S1 and the mixed signal S2, it is important that the phase conjugacy is established in the propagation environment 3 from the sound source 4 to the transducer array 5. As shown in FIG. 2, the phase conjugation includes active phase conjugation related to the outgoing and incoming paths between the sound source 4 and the transducer array 5 as well as passive phase conjugation related only to the outgoing path from the sound source 4 to the transducer array 5.

The phase conjugation determination unit 9 applies the passive phase conjugation for determining the reference sound field. Specifically, the phase conjugation determination unit 9 determines the phase conjugacy in the reference sound field based on following formulae (1) and (2).

[Expression 1]

$$R_{id}(\vec{r}_m; t) = \int_0^T P_d(\vec{r}_m; t' + t) P_i(\vec{r}_m; t') dt' \quad (1)$$

$$S(t) = \sum_{m=1}^M w_m R_{id}(\vec{r}_m; t) \quad (2)$$

Note here that $P_i(r_m; t)$ is a reference signal, and $P_d(\vec{r}_m; t)$ is a data signal. The right side of formula (1) shows a correlation between the reference signal and the data signal, and the result of the correlation is expressed in a following Expression.

$$R_{id}(\vec{r}_m; t) \quad \text{[Expression 2]}$$

Since the reference signal and the data signal are the same in a case of detecting a target in the propagation environment, a following Expression is an autocorrelation function.

$$R_{id}(\vec{r}_m; t) \quad \text{[Expression 3]}$$

Formula (2) needs to apply in a case where the propagation environment 3 in the reference sound field exhibits the phase conjugacy. The phase conjugation determination unit 9 investigates the similarity between the autocorrelation function of the sound pulse projected from the sound source 4 in the propagation environment 3 in the reference sound field and S(t) shown by formula (2) as a correlation result acquired by adding the autocorrelation functions of the reference signals S1 received at all the elements 5a of the transducer array 5, and determines that the propagation environment 3 in the reference sound field exhibits the phase conjugacy when judged that those are similar.

In general, the phase conjugacy is judged based on formula (2). However, it is important that the normal phase and inverted-phase sound pulses from the sound source 4 are offset by the phase conjugation determination unit 9 in the exemplary embodiment of the invention. That is, as described in the exemplary embodiment of the invention, the phase conjugation determination unit 9 checks whether or not the phase conjugacy is established in the propagation environment 3 from the sound source 4 to the transducer array 5 by applying the passive phase conjugation for determining the reference sound field through projecting calibration signals of a normal phase and an inverted phase from the sound source 4 in the propagation environment where there is no target 1, receiving the calibration signals at the elements 5a of the transducer array 5, and utilizing the fact that the normal phase and inverted-phase sound pulses offset each other and that the pulses exhibit compressibility.

Further, while formula (2) shows the form of the cross correlation function, the phase conjugation determination unit 9 uses the autocorrelation function in the exemplary embodiment of the invention. To make a comparison with the autocorrelation function by the phase conjugation determination unit 9 is equivalent to making a comparison with the waveform of the sound pulse that is the basis thereof. Thus, for judging the offset property of the sound pulses by the phase conjugation determination unit 9, it is shown with the waveform of the sound pulse hereinafter.

A simulation of the pulse waveform when there is no target 1 existing in the shallow water 3 will be described. In this simulation, the water depth of the shallow water 3 as the propagation environment is 100 m, the distance between the sound source 4 and the transducer array 5 is 3 km, the depth at which the sound source 4 is placed is 50 m, and the sound pulse is a tone burst wave of 8 cycles with the center frequency of 500 Hz as shown in FIG. 7.

FIG. 3A shows the pulse waveforms of a case where the tone burst wave is projected from the sound source 4 when there is no target 1 existing in the shallow water 3 and received at the element 5a located in the center of the transducer array 5. The pulse waveform shown as a1 of FIG. 3A is the pulse waveform of the reference signal S1 when the normal phase sound pulse is projected from the sound source 4 into the propagation environment 3 of the reference sound field and that sound pulse is received by the transducer array 5. The pulse waveform shown as a2 of FIG. 3A is the pulse waveform of the reference signal S2 when the sound pulse of the inverted phase from the normal phase sound pulse is projected and that sound pulse is received by the transducer array 5. Therefore, the phases of the reference signal 51 shown as a1 and the reference signal S2 shown as a2 are in a relation inverted from each other.

The addition processing unit 7 performs the vector addition processing on the reference signal S1 in the reference sound field shown as a1 and the reference signal S2 in the reference sound field shown as a2. In this case, it is a condition that there is no target 1 existing in the propagation environment 3. Thus, as a result of executing the vector addition processing by the addition processing unit 7, the traveling wave 6 is eliminated and no forward scattered wave 2 from the target 1 existing in the output signal thereof. Therefore, the signal level becomes zero as in a3 of FIG. 3A.

FIG. 3B shows waveforms of the signals acquired by adding all the signals received at each of the elements 5a of the transducer array 5. This is shown by corresponding to formula (2), in which b1 is the normal phase sound pulse, b2 is the inverted-phase sound pulse, and b3 is the waveform acquired by adding the sound pulses of b1 and b2 by the addition processing unit 7. Comparing b1 and b2 of FIG. 3B with a1 and a2 of FIG. 3A, it can be found that the width of the sound pulse becomes shorter. Further, it can be found that b1 and b2 are the tone burst waves projected from the sound source 4. This proves that the propagation environment 3 exhibits the phase conjugacy. In this case, the phase conjugation determination unit 9 determines that the reference sound field exhibits the phase conjugacy (YES in step 102).

Next, a simulation of the pulse waveform when there is the target 1 existing in the propagation environment 3 along with the obstacle B will be described. In this simulation, the water depth of the shallow water 3 as the propagation environment is 100 m, the distance between the sound source 4 and the transducer array 5 is 3 km, the depth at which the sound source 4 is placed is 50 m, and the target 1 of 2 m both in length and width is disposed at the position of 1.5 km from the sound source 4 and at the depth of 50 m.

The pulse waveforms of a case where there is the target 1 existing in the propagation environment 3 are shown in FIG. 4. As in the case of FIG. 3, FIG. 4A shows the waveforms of the sound pulse received at the element 5a located in the middle among a plurality of the elements 5a of the transducer array 5. FIG. 4B shows waveforms of the signals acquired by adding all the signals received at each of the elements 5a of the transducer array 5. This is shown by corresponding to formula (2), in which b1 is the normal phase sound pulse, b2 is the inverted-phase sound pulse, and b3 is the waveform acquired by adding the sound pulses of b1 and b2 by the addition processing unit 7. Comparing the normal phase of b1 in FIG. 4B with the normal phase of a1 in FIG. 4A and comparing the inverted phase of b1 in FIG. 4B with the inverted phase of a2 in FIG. 4A, respectively, it can be found that the width of the sound pulse becomes shorter.

However, when the addition processing is applied on a3 of FIG. 4A and b3 of FIG. 4B by the addition processing unit 7, the signal level does not become zero but there is a remaining signal. The addition processing unit 7 extracts the remaining signal as the signal of only the forward scattered wave 2 scattered forward at the target 1. The time reversal processing unit 8 generates a sound pulse that is a time reversal signal by performing the time reversal processing only on the forward scattered wave 2 of the target 1 extracted by the addition processing unit 7. When the sound pulses that are the time reversal signals are re-radiated from the elements 5a of the transducer array 5, the sound pulses converge to the position of the target 1. Therefore, the target 1 can be recognized from the converged position.

The sound field calculation unit 11 calculates the time reversal sound field projected from the elements 5a of the transducer array 5, which is the sound pulse that is the time reversal signal generated by the time reversal processing unit 8, based on the acoustic constant determined by the acoustic constant generation unit 10 on condition that the result of the check done by the phase conjugation determination unit 9 shows that the phase conjugacy is established in the propagation environment 3 from the sound source 4 to the transducer array 5 (step 103 of FIG. 5).

That is, the sound field calculation unit 11 receives the time-reversed sound pulse from the time reversal processing unit 8, and calculates the time reversal sound field of that sound pulse based on formula (3) (step 103 of FIG. 5).

[Expression 4]

$$P_{pc}(r, z; t) = \sum_{m=1}^{M} \int G_\omega(r, z, z_m) S_r(\omega) e^{-i\omega t} d\omega \quad (3)$$

Formula (3) is established in Non-Patent Document 3: W. A. Kuperman, W. S. Hodgkiss, C. Song, T. Akal, C. Ferla and D. R. Jackson "Phase conjugation in the ocean; Experimental demonstration of an acoustic time-reversal mirror" J. Acoust. Soc. Am. 103, 25-40 (1998). In formula (3), $G\omega$, t, and z are Green's function, time, and depth, respectively. Further, r shows the distance from the transduce array 5 to the calculation point, $S_r(\omega)$ is a frequency spectrum of the sound pulse projected from the transducer array 5, and $\omega$ is an angular frequency.

When the convergence of the sound pulse in the time reversal sound field calculated by the sound field calculation unit 11 is clear (YES in step 104 of FIG. 5), the control unit 14 receives an output from the sound field calculation unit 11 and displays the amplitude distribution of the sound pulse in the time reversal sound field on a screen of the indication unit 15 by using GUI. The operator detects the target 1 by monitoring the amplitude distribution of the sound pulse in the time reversal sound field displayed on the indication unit 15 (step 105 of FIG. 5).

The target identification unit 12 functions when convergence of the sound pulse in the time reversal sound field calculated by the sound field calculation unit 11 is unclear (NO in step 104 of FIG. 5), and determines the target 1 (step 106 of FIG. 5). Specifically, the distance from the position at which the time-reversal processed sound pulses converge to the target 1 to the sound source 4 is 1.7 km and the depth is 50 m in FIG. 12. However, there may be cases where the time reversal sound field is unclear. That is, while the time-reversal processed sound pulses converge to the target 1 at the position with the distance of 1.7 km, there are also parts in white indicating that the sound pressure is the strongest observed on top and bottom by sandwiching a white part indicating that the sound pulses converge to the target 1 as can be seen in FIG. 12. Therefore, it is necessary to discriminate the white parts on top and bottom from the white part in the center (the convergence of the time reversal sound pulse).

Thus, the target identification unit 12 determines the target 1 by utilizing the fact that the waveform of the sound pulse which is the time-reversal processed sound pulse and converged to the position of the target 1 and the waveform of the sound pulse projected from the sound source 4 and arrived at the target 1 as shown in FIG. 4 become similar. That is, the target identification unit 12 determines the target 1 through discriminating the white parts on top and bottom from the white part in the center (the convergence of the time reversal sound pulse) by applying the theory shown in FIG. 4 (step 106 of FIG. 5).

As described above, the exemplary embodiment of the invention extracts only the forward scattered wave scattered forward at the target by performing the vector addition processing on the reference signal acquired in the reference sound field of the actual propagation environment including the obstacles other than the target as the detection target and the mixed signal acquired in the mixed sound field of the actual propagation environment including the target, applies the time reversal processing on the extracted forward scattered wave, and converges it to the position of the target. This makes it possible to detect an object existing in a shaded region of the seamount as well as icebergs as obstacles or a target existing in the back of an obstacle considered to be difficult to detect by a widely-used sonar and a method using backward scattered waves and time reversal.

Further, regarding the propagation environment of the reference sound field where the reference signal is acquired, it is verified that there is no problem for detecting a target even in a propagation environment of the sound pulse having an obstacle existing therein other than the target. Thus, a complicated propagation environment and an environment having obstacles existing therein can also be used as the reference sound field, so that it is possible to detect a target in the complicated propagation environment. As a result, it becomes possible to detect an object existing in a shaded region of the seamount as well as icebergs as obstacles or a target existing in the back of the obstacle considered to be difficult to detect by a widely-used sonar and a method using backward scattered waves and time reversal.

Further, the exemplary embodiment of the invention checks whether or not the phase conjugacy is established in the propagation environment from the sound source to the transducer array by employing the passive phase conjugation for determining the reference sound field, and detects the target in the propagation environment based on the reference signal and the mixed signal as described above on condition that the phase conjugacy is established. Therefore, it is possible to detect the target accurately and surely.

With the method proposed by C. Prada et al., i.e., the method which repeats the time reversal processing on the backward scattered waves which scatter (reflect) backward from a target, it is necessary to repeat the time reversal processing twice or more. Thus, it takes a tremendous amount of time for detecting the target. In the meantime, the exemplary embodiment of the invention can detect the target by executing the time reversal processing once, so that the time required for detection can be shortened.

While embodiment of the invention has been described by referring the case where the propagation environment is the shallow water, the embodiment is not limited only to such case. The present invention may be employed in any propagation environments as long as the sound pulse can propagate therein.

Further, while the case of building the detection device according to the embodiment of the present invention as hardware has been described above, the present invention is not limited only to such case. That is, the functions executed by the target detection device according to the present invention may be achieved by building the functions executed by the target detection device according to the present invention as a program and causing a computer to execute the program. In that case, the program is recorded on a recording medium, and the program in that state becomes a target of a commercial transaction.

This application claims the Priority right based on Japanese Patent Application No. 2008-287203 filed on Nov. 7, 2008 and the disclosure thereof is hereby incorporated by reference in its entirety.

Industrial Applicability

The present invention makes it possible to detect targets that are detection targets easily even when those targets exist in a shaded region of an obstacle when viewed from a sound source side. Therefore, the present invention can be applied for detecting targets in a wide range.

BRIEF DESCRIPTION OF THE DRAWINGS

FIG. 1 is a block diagram showing a detection device according to an exemplary embodiment of the invention;

FIG. 2 is a chart for describing a theory for determining a reference sound field in the exemplary embodiment of the invention;

FIG. 6 is a chart showing a relation between a backward scattered wave and a forward scattered wave based on a sound pulse making incident on a target;

Figure 3A:
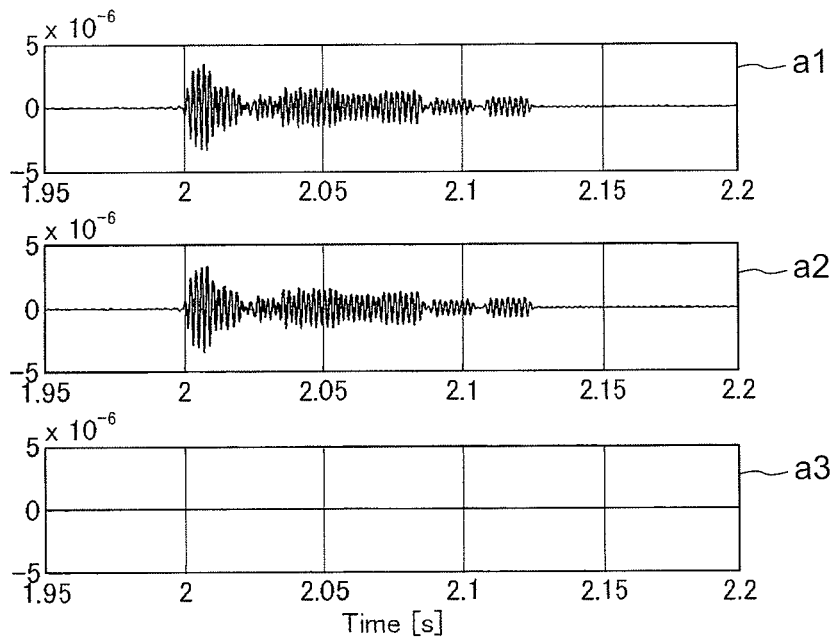
FIG. 3 shows pulse waveform charts of a case where there is no target as a detection target existing in a propagation environment.
Figure 3B:
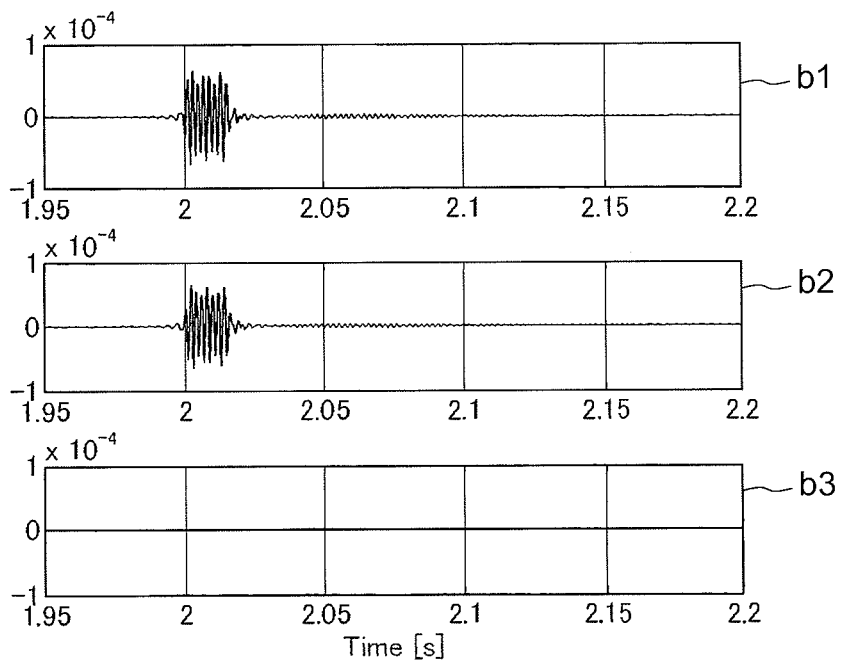
Figure 4A:
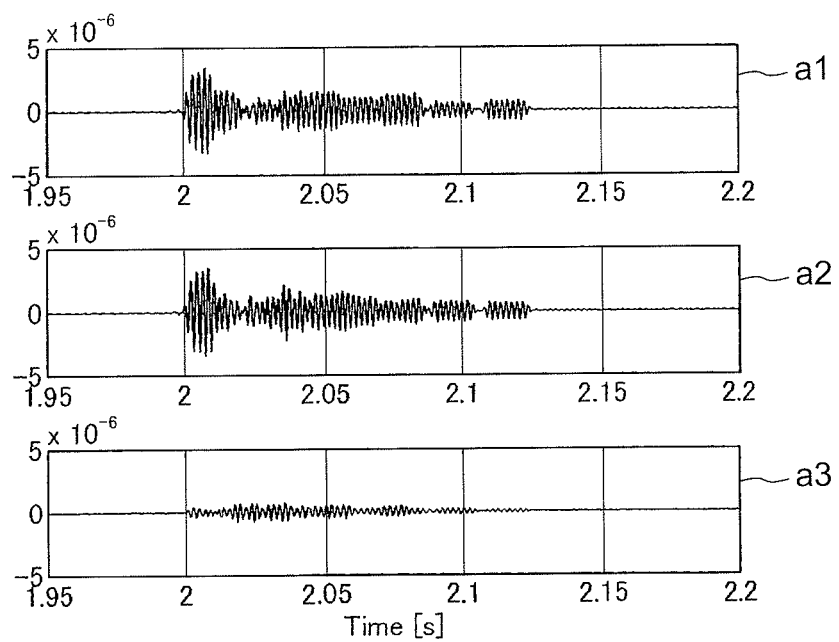
FIG. 4 shows pulse waveform charts of a case where there is a target as a detection target existing in a propagation environment.
Figure 4B:
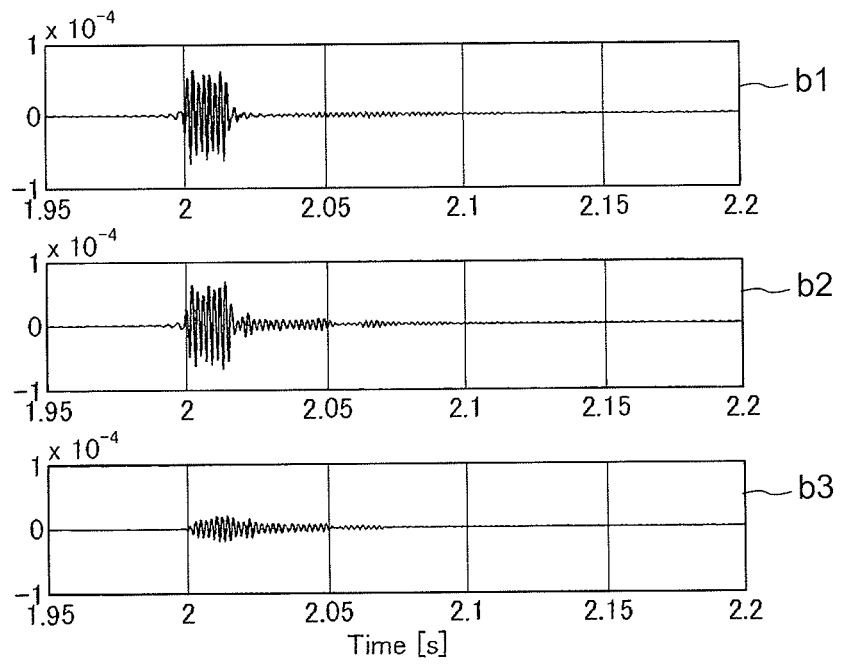
Figure 5:
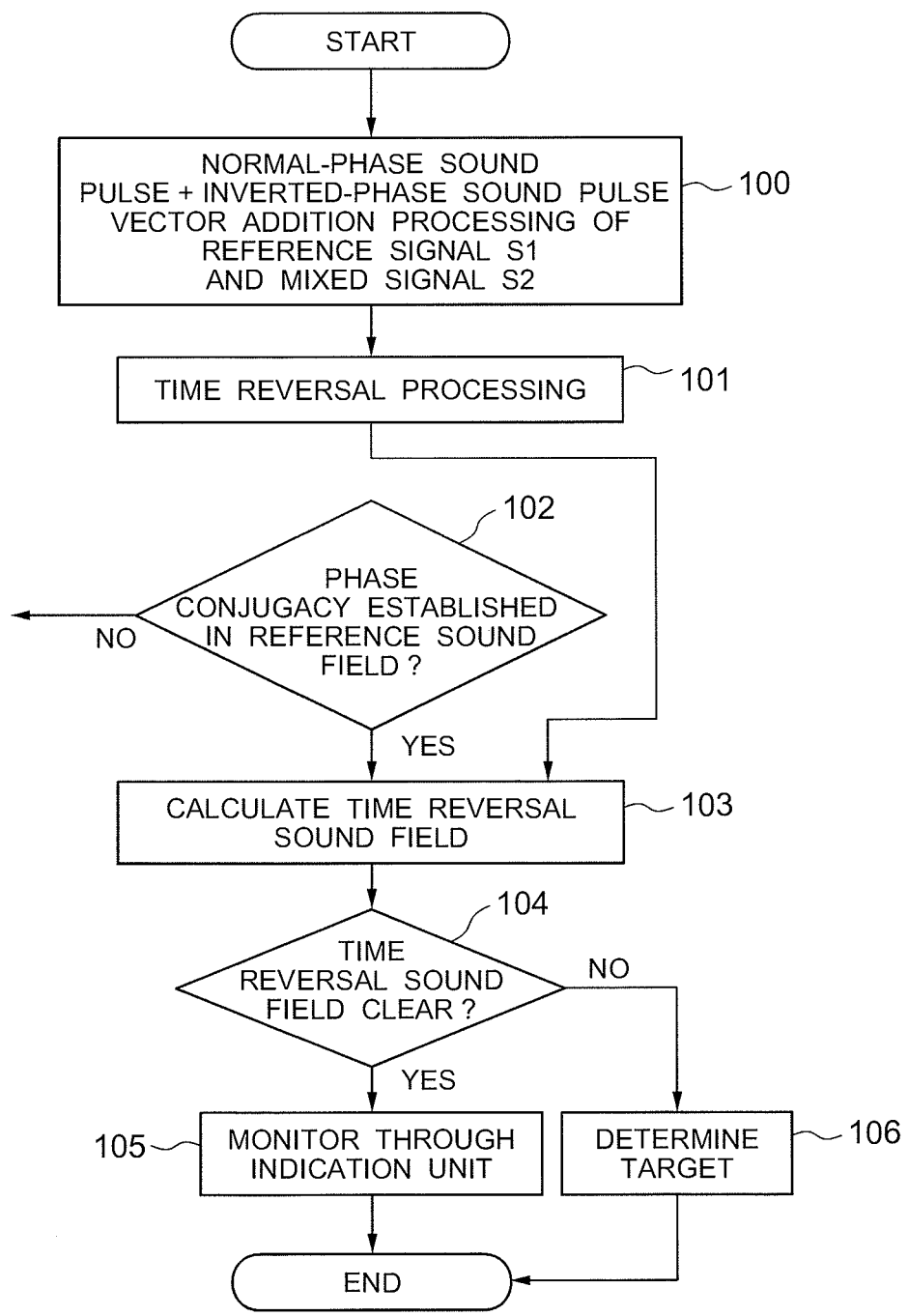
FIG. 5 is a flowchart showing a case where a target is detected by using the detection device according to the exemplary embodiment of the invention.
Figure 7A:
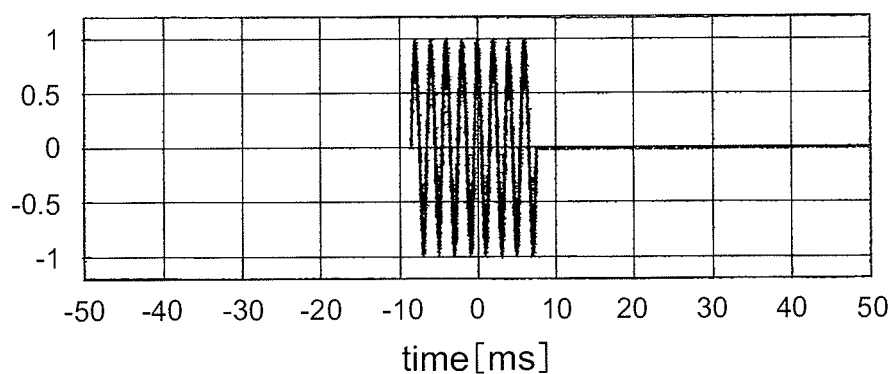
FIG. 7 shows charts of tone burst waves projected from a sound source.
Figure 7B:
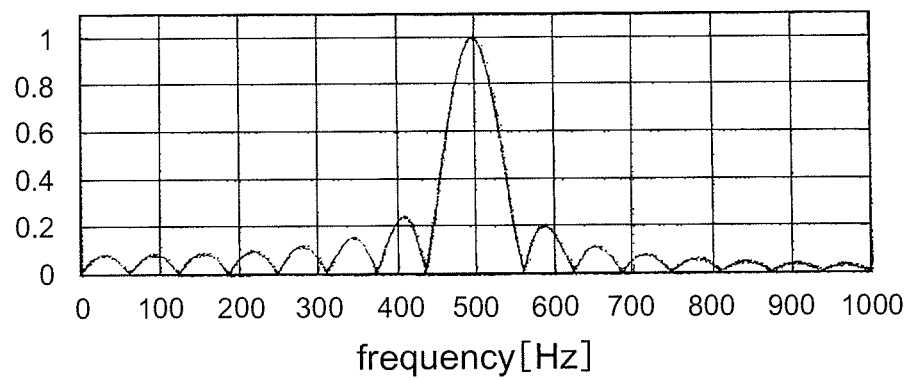
Figure 8:
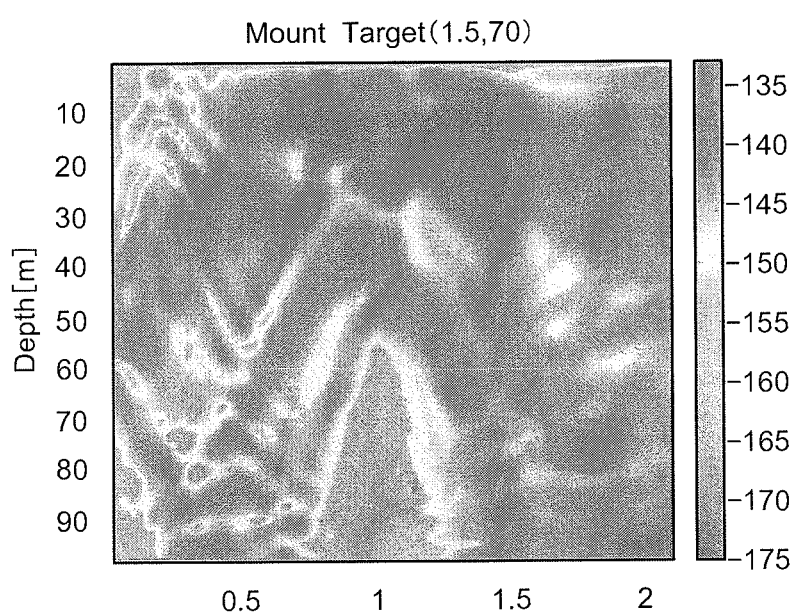
FIG. 8 is a chart showing an amplitude distribution of the sound pulse acquired as a result of a simulation conducted in the exemplary embodiment of the invention.
Figure 9:
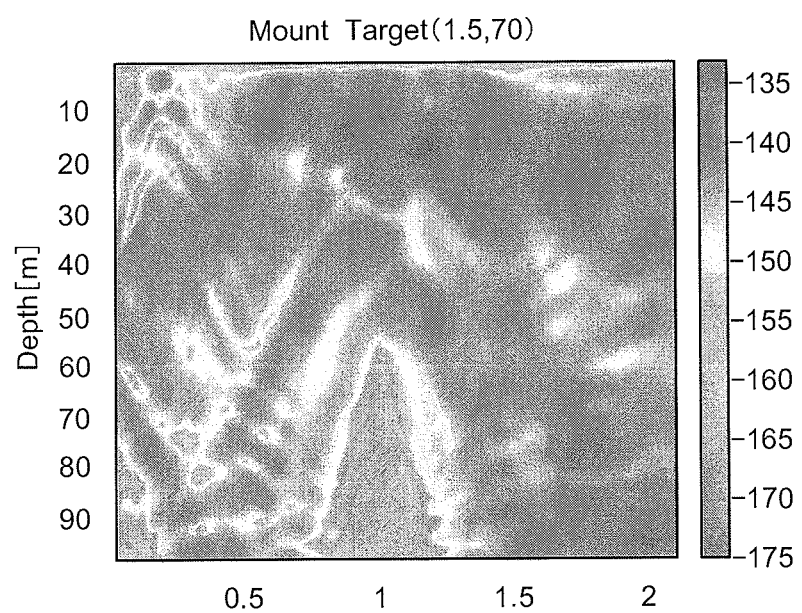
FIG. 9 is a chart showing an amplitude distribution of the sound pulse acquired as a result of a simulation conducted in the exemplary embodiment of the invention.
Figure 10:
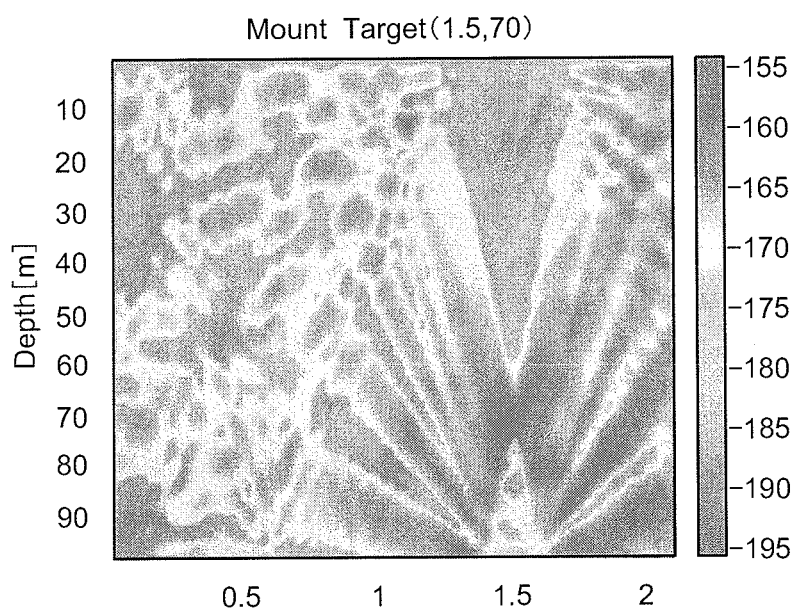
FIG. 10 is a chart showing an amplitude distribution of the sound pulse acquired as a result of a simulation conducted in the exemplary embodiment of the invention.
Figure 11:
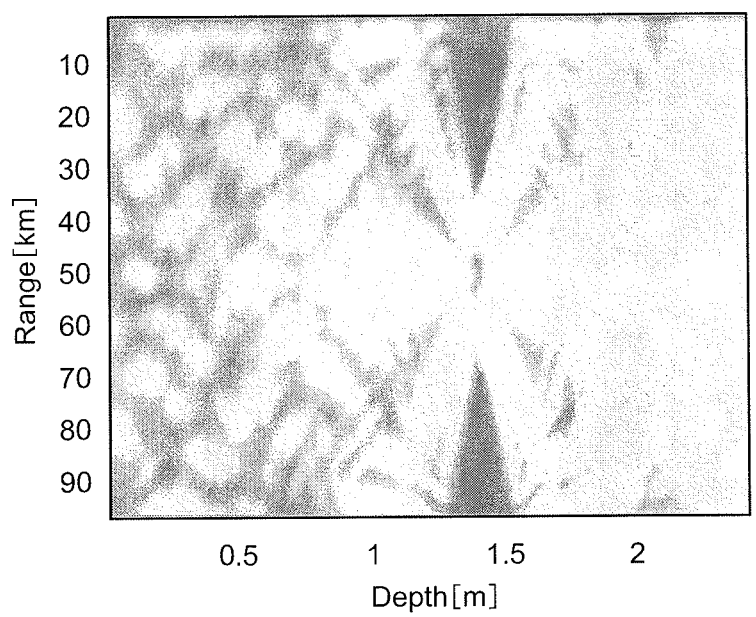
FIG. 11 is a chart showing an amplitude distribution of the sound pulse acquired as a result of a simulation conducted in the exemplary embodiment of the invention.
Figure 12:
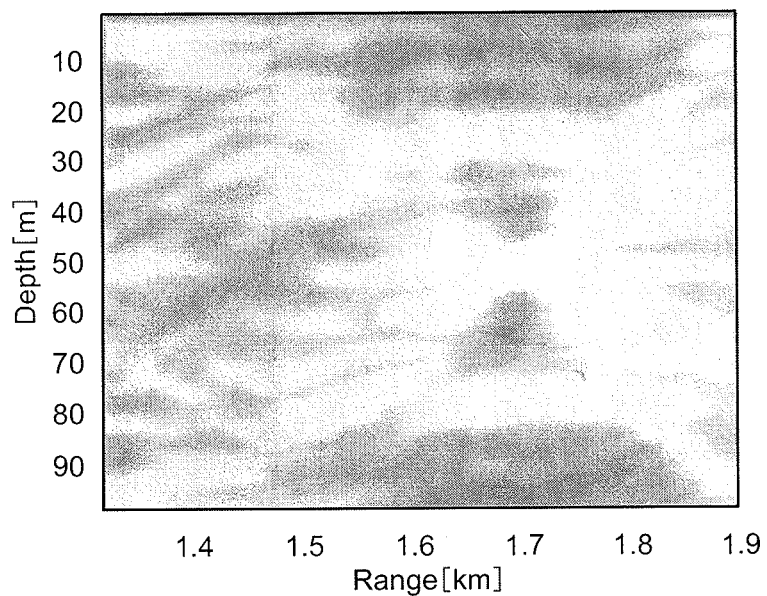
FIG. 12 is a chart showing an amplitude distribution of the sound pulse acquired as a result of a simulation conducted in the exemplary embodiment of the invention.

| REFERENCE NUMERALS | |
|---|---|
| 1 | Target |
| 2 | Forward scattered wave |
| 3 | Propagation environment |
| 4 | Sound source |
| 5 | Transducer array |
| 7 | Addition processing unit |
| 8 | Time reversal processing unit |
| 9 | Phase conjugation determination unit |
| 10 | Acoustic constant unit |
| 11 | Sound field calculation unit |
| 12 | Target identification unit |
| S1 | Reference signal |
| S2 | Mixed signal |

What is claimed is:

1. A target detection device for detecting a target existing in a propagation environment, which detects the target by using a forward scattered wave scattered forward from the target, the device comprising:
a sound source which projects a sound pulse within the propagation environment;
a transducer array disposed in a region for receiving a forward scattered wave scattered forward from an object existing in the propagation environment;
an addition processing unit, implemented by a computer processor, configured to extract only a signal of the forward scattered wave by applying vector addition processing on a reference signal scattered forward from an obstacle in a reference sound field received by the transducer array under a state where an obstacle exists in the propagation environment and a mixed signal in a mixed sound field received by the transducer array under a state where the target exists in the propagation environment in addition to the obstacle;
a phase conjugation determination unit, implemented by the computer processor, configured to check whether or not a phase conjugacy is established in the propagation environment from the sound source to the transducer array by receiving the signal of the forward scattered wave extracted by the vector addition processing performed by the addition processing unit and employing a passive phase conjugation for determining the reference sound field; and
a time reversal processing unit, implemented by the computer processor, configured to generate a time-reversed time reversal signal by applying time reversal processing on the forward scattered wave, on condition that the phase conjugation determination unit judges that the phase conjugacy is established.

2. The target detection device as claimed in claim 1, wherein
the sound source projects a first sound pulse of a normal phase to the propagation environment in the reference sound field, and projects a second sound pulse that is in an inverted phase relation from the first sound pulse of the normal phase to the propagation environment in the mixed sound field.

3. The target detection device as claimed in claim 1, comprising:
an acoustic constant generation unit, implemented by the computer processor, configured to generate an acoustic constant required for calculating a time reversal sound field radiated from the transducer array;
a sound field calculation unit, implemented by the computer processor, configured to calculate the time reversal sound field when the sound pulse of the time reversal signal is radiated, based on the time reversal signal generated by the time reversal processing unit and the acoustic constant generated by the acoustic constant generation unit; and
a target identification unit, implemented by the computer processor, configured to identify the target from an amplitude distribution of the sound pulse in the time reversal sound field calculated by the sound field calculation unit.

4. A non-transitory computer readable recording medium storing a target detection control program for controlling detection of a target existing in a propagation environment, which causes a computer to execute a method comprising:
extracting only a signal of a forward scattered wave by applying vector addition processing on a reference signal scattered forward from an obstacle in a reference sound field received by a transducer array under a state where an obstacle exists in the propagation environment and a mixed signal in a mixed sound field received by the transducer array under a state where the target exists in the propagation environment in addition to the obstacle; and
checking, by a computer processor, whether or not a phase conjugacy is established in the propagation environment from a sound source to the transducer array by employing a passive phase conjugation for determining the reference sound field, and generates a time-reversed time reversal signal by applying time reversal processing on the extracted forward scattered wave on condition that the phase conjugacy is established.

5. The non-transitory computer readable recording medium storing the target detection control program as claimed in claim 4, which causes the computer to execute the method further comprising:
generating an acoustic constant required for calculating a time reversal sound field radiated from the transducer array;
calculating, the time reversal sound field when the sound pulse of the time reversal signal is radiated, based on the time reversal signal and the acoustic constant; and
identifying the target from an amplitude distribution of the sound pulse in the time reversal sound field.

6. A target detection method for detecting a target existing in a propagation environment, which detects the target by using a forward scattered wave scattered forward from the target, the method comprising:
projecting a sound pulse within the propagation environment;
extracting only a signal of the forward scattered wave by applying vector addition processing on a reference signal scattered forward from an obstacle in a reference sound field received by a transducer array under a state where an obstacle exists in the propagation environment and a mixed signal in a mixed sound field received by the transducer array under a state where the target exists in the propagation environment in addition to the obstacle; and checking, by a computer processor, whether or not a phase conjugacy is established in the propagation environment from a sound source to the transducer array by employing a passive phase conjugation for determining the reference sound field, and generating a time-reversed time reversal signal by applying time reversal processing on the extracted forward scattered wave on condition that the phase conjugacy is established.

7. The target detection method as claimed in claim 6, comprising projecting a sound pulse of a normal phase to the propagation environment in the reference sound field, and projecting a sound pulse that is in an inverted phase relation from the sound pulse of the normal phase to the propagation environment in the mixed sound field.

8. The target detection method as claimed in claim 6, comprising:

generating an acoustic constant required for calculating a time reversal sound field radiated from the transducer array;

calculating the time reversal sound field when the sound pulse of the time reversal signal is radiated, based on the time reversal signal and the acoustic constant; and identifying the target from an amplitude distribution of the sound pulse in the time reversal sound field.

9. A target detection device for detecting a target existing in a propagation environment, which detects the target by using a forward scattered wave scattered forward from the target, the device comprising:

a sound source which projects a sound pulse within the propagation environment;

a transducer array disposed in a region configured to receive a forward scattered wave scattered forward from an object existing in the propagation environment;

addition processing means, implemented by a computer processor, configured to extract only a signal of the forward scattered wave by applying vector addition processing on a reference signal scattered forward from an obstacle in a reference sound field received by the transducer array under a state where an obstacle exists in the propagation environment and a mixed signal in a mixed sound field received by the transducer array under a state where the target exists in the propagation environment in addition to the obstacle;

phase conjugation determination means configured to check whether or not a phase conjugacy is established in the propagation environment from the sound source to the transducer array by receiving the signal of the forward scattered wave extracted by the vector addition processing performed by the addition processing means and employing a passive phase conjugation for determining the reference sound field; and time reversal processing means configured to generate a time-reversed time reversal signal by applying time reversal processing on the forward scattered wave, on condition that the phase conjugation determination means judges that the phase conjugacy is established.

* * * * *